(12) United States Patent
Cochrane et al.

(10) Patent No.: US 9,129,063 B2
(45) Date of Patent: Sep. 8, 2015

(54) VISUALIZING A COMPUTER PROGRAM EXECUTION HISTORY

(71) Applicant: Oracle International Corporation, Redwood Shores, CA (US)

(72) Inventors: Neil James Cochrane, Alameda, CA (US); Campegius L. Bronkhorst, Tucson, AZ (US); Michael Ingram Yawn, Roseville, CA (US)

(73) Assignee: Oracle International Corporation, Redwood Shores, CA (US)

(*) Notice: Subject to any disclaimer, the term of this patent is extended or adjusted under 35 U.S.C. 154(b) by 108 days.

(21) Appl. No.: 13/893,429

(22) Filed: May 14, 2013

(65) Prior Publication Data

US 2014/0344787 A1    Nov. 20, 2014

(51) Int. Cl.
*G06F 9/44* (2006.01)
*G06F 11/36* (2006.01)
*G06F 11/32* (2006.01)

(52) U.S. Cl.
CPC .......... *G06F 11/3664* (2013.01); *G06F 11/323* (2013.01); *G06F 11/3624* (2013.01); *G06F 11/3636* (2013.01)

(58) Field of Classification Search
CPC .............. G06F 11/323; G06F 11/3636; G06F 11/3664; G06F 11/3624
See application file for complete search history.

(56) References Cited

U.S. PATENT DOCUMENTS

| | | | | |
|---|---|---|---|---|
| 5,210,859 A | * | 5/1993 | Aoshima et al. | 714/46 |
| 5,315,697 A | * | 5/1994 | Nagamatsu | 715/723 |
| 5,375,125 A | * | 12/1994 | Oshima et al. | 714/38.13 |
| 6,003,143 A | * | 12/1999 | Kim et al. | 714/38.13 |
| 6,141,791 A | * | 10/2000 | Takuma et al. | 717/125 |
| 7,216,336 B1 | * | 5/2007 | Ezra et al. | 717/124 |
| 2001/0014958 A1 | * | 8/2001 | Yamauchi et al. | 714/38 |
| 2002/0073063 A1 | * | 6/2002 | Faraj | 707/1 |
| 2002/0178382 A1 | * | 11/2002 | Mukai et al. | 713/201 |
| 2006/0101413 A1 | * | 5/2006 | Kinno et al. | 717/127 |
| 2006/0184777 A1 | * | 8/2006 | Mericas | 712/227 |
| 2007/0006165 A1 | * | 1/2007 | Lam et al. | 717/128 |
| 2009/0037468 A1 | * | 2/2009 | Hsu et al. | 707/104.1 |

(Continued)

OTHER PUBLICATIONS

Richard Snodgrass, "A Relational Approach to Monitoring Complex Systems" [Online], 1988, pp. 157-196, [Retrieved from Internet on May 8, 2015], <http://www.cs.arizona.edu/~rts/pubs/TOCS88.pdf>.*

(Continued)

*Primary Examiner* — Thuy Dao
*Assistant Examiner* — Ziaul A Chowdhury
(74) *Attorney, Agent, or Firm* — Miles & Stockbridge P.C.

(57) ABSTRACT

A software application profiling environment is provided, where the software application profiling environment monitors an execution of a software application, where a software application includes one or more computer programs. The software application profiling environment further stores execution history information for the one or more computer programs of the software application. The software application profiling environment further displays some or all of the computer program instructions of the computer program, and further displays a visualization of the stored execution history information. The visualization can be a static visualization or a dynamic visualization. Further, the visualization can be overlaid on top of the computer program instructions of the computer program.

20 Claims, 7 Drawing Sheets

(56) References Cited

U.S. PATENT DOCUMENTS

2013/0085720 A1* 4/2013 Xie et al. ............................ 703/1
2013/0111447 A1* 5/2013 Amano et al. ................. 717/125

OTHER PUBLICATIONS

Carlo Rainieri et al., "Implementation of OMA Procedures Using Labview Theory and Application", [Online], 2007, pp. 1-12, [Retrieved from Internet on May 8, 2015], <http://www.iomac.dk/sync/uploads/485ec6a3991a8ccc473d3d4ce37aff74.pdf>.*

Zhan Cui et al. "An In-Service Agent Monitoring and Analysis System", [Online], 1999, pp. 1-8, [Retrieved from Internet on May 8, 2015], <http://www.biotec.tu-dresden.de/fileadmin/groups/schroeder/group/papers/cui_ictai99.pdf>.*

Kelvin Ko et al., "Automated Detection of Vulnerabilities in Privileged Programs by Execution Monitoring", [Online], 1994, pp. 134-144, [Retrieved from Internet on May 8, 2015], <http://seclab.cs.ucdavis.edu/papers/pdfs/ck-gf-kl-94.pdf>.*

Wikipedia, "Integrated development environment", Wikipedia, the free encyclopedia, http://en.wikipedia.org/wiki/Integrated_development_environment, May 14, 2013.

Wikipedia, "Debugger", Wikipedia, the free encyclopedia, http://en.wikipedia.org/wiki/Debugger, May 14, 2013.

Visual Studio 2012, "Debug Your App by Recording Code Execution with IntelliTrace", http://msdn.microsoft.com/en-us/library/vstudio/dd264915.aspx, May 14, 2013.

* cited by examiner

```
     @Override
200  public void ancestorMoved(AncestorEvent event) ----- 0MS
     {
201    if (parent == null)--
         return; // must be disposed already.
                                           0MS
202    if (!parent.isShowing())
       {
         hide ();
         return;
       }
203    Point newParentOrigin = parent.getLocationOnScreen(); ------ 32MS
204    if ( !(event.getAncestor() instanceof Window))  // don't adjust for window moves, only in-window moves
       {                                                                      4MS
205      int newX = parentOrigin.x - newParentOrigin.x;   0MS
206      int newY = parentOrigin.y - newParentOrigin.y;   0MS
207      infoTip.this.location.x -= newX;    0MS
208      infoTip.this.location.y -= newY;    0MS
       }
209    parentOrigin = newParentOrigin;
       ensureVisible();
     }
```

```
31  }
32      JFrame frame = new JFrame();
33      frame.setSize(300, 400);
34      frame.setLocationRelativeTo(null);               ← Breakpoint
35      frame.setLayout(new FlowLayout());
36      frame.setDefaultCloseOperation(JFrame.EXIT_ON_CLOSE);
37      frame.add(getCheckboxTree());             Step To: CheckBoxTreeDemo.getCheckboxTree
38      frame.add(getCheckBox());
39      frame.setVisible(true);
40  }
41
42  private JComponent getCheckboxTree()         Step From: CheckBoxTreeDemo
43  {
44      DefaultMutableTreeNode  root = new TriStateNode("Lunch");
45
46      if (root == null)
47      {
48          System.out.println("No root");
49          return null ;
50      }
51
52      DefaultMutableTreeNode sandwiches = new TriStateNode("Sandwiches");
53      DefaultMutableTreeNode cheese = new TriStateNode("Cheese");
54      DefaultMutableTreeNode beef = new TriStateNode("Beef");
55      DefaultMutableTreeNode ham = new TriStateNode("Ham");
```

VISUALIZING A COMPUTER PROGRAM EXECUTION HISTORY

FIELD

One embodiment is directed to a computer system, and more particularly, to a computer system that tracks an execution of a computer program.

BACKGROUND

An integrated development environment ("IDE") is a software development environment that can provide comprehensive facilities to computer programmers for software development. An IDE typically includes a source code editor, one or more build automation tools, and a debugger. A debugger of an IDE can allow a user to step through a plurality of computer program instructions of a debugged software application, and view the current state of a debugged software application at any point. Typically, an IDE allows a user to step forward along a timeline of execution of the debugged software application.

SUMMARY

One embodiment is directed to a system that displays a visualization of an execution history of a computer program. The system monitors an execution of one or more computer program instructions of a computer program. The system further stores information about an execution history of the one or more computer program instructions. The system further displays at least one computer program instruction of the one or more computer program instructions within a graphical user interface. The system further displays a visualization of the stored information within a graphical user interface.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 2 illustrates a graphical user interface of a software application profiling environment that displays a visualization of execution history information along with a plurality of computer program instructions, where the display of the visualization is overlaid onto the display of the one or more computer program instructions, according to an embodiment of the invention.

FIG. 3 illustrates a graphical user interface of a software application profiling environment that displays a visualization of execution history information along with a plurality of computer program instructions, where the visualization includes a visual execution path between two methods of a computer program, according to an embodiment of the invention.

DETAILED DESCRIPTION

In one embodiment, a software application profiling environment, such as a debugger that is part of an integration development environment, is provided, where the software application profiling environment monitors an execution of a software application, where a software application includes one or more computer programs. The software application profiling environment further displays a visualization of an execution path across one or more computer program instructions of a computer program, as well as a visualization of execution history information (such as a state of one or more variables of the software application) along the execution path. The software application profiling environment can further display some or all of the computer program instructions of the computer program, and the software application profiling environment can further overlay the displayed visualization onto the displayed computer program instructions. Thus, the visualization can be displayed in-line with the computer program instructions of the computer program.

Figure 1:
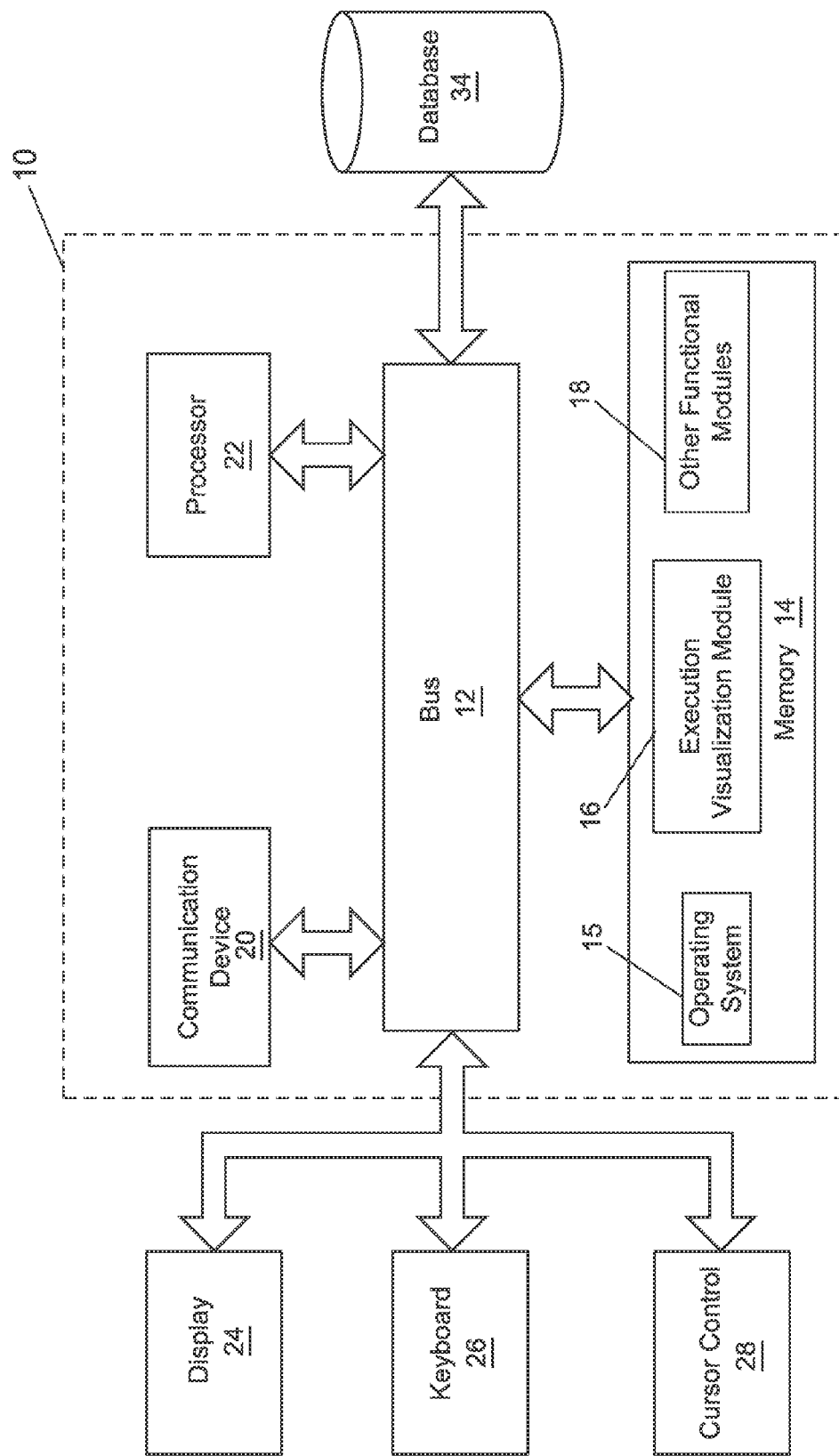
FIG. 1 illustrates a block diagram of a system that can implement an embodiment of the invention.

FIG. 1 illustrates a block diagram of a system 10 that can implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, an execution visualization module 16, as well as other functional modules 18. Operating system 15 can provide an operating system functionality for system 10. Execution visualization module 16 can provide functionality for displaying a visualization of a computer program's execution history, as will be described in more detail below. In certain embodiments, execution visualization module 16 can comprise a plurality of modules, where each module provides specific individual functionality for displaying a visualization of a computer program's execution history. System 10 can also be part of a larger system. Thus, system 10 can include one or more additional functional modules 18 to include the additional functionality. For example, functional modules 18 may include modules that provide additional functionality, such as the "Oracle JDeveloper" integrated development environment product from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

FIG. 2 illustrates a graphical user interface of a software application profiling environment that displays a visualization of execution history information along with a plurality of computer program instructions, where the display of the visualization is overlaid onto the display of the one or more computer program instructions, according to an embodiment of the invention.

A software application profiling environment is an environment that monitors an execution of one or more computer programs of a software application, where a computer program includes one or more computer program instructions. In certain embodiments, the software application profiling environment itself is a software application. An example of a software application profiling environment is a debugger, where a debugger is a software application that is used to test and debug other software applications, and where the debugger can be part of an overall IDE.

The software application profiling environment can execute a computer program of a software application by executing one computer program instruction of the computer program after another, where the computer program includes one or more computer program instructions. The software application profiling environment can further pause the execution of the computer program at any computer program instruction of the computer program. During execution, the software application profiling environment can monitor information about an execution history of the one or more computer program instructions (i.e., "execution history information"). Such execution history information can include at least one of: one or more identities of one or more computer program instructions that are executed; an order of the one or more computer program instructions that are executed; one or more execution durations of the one or more computer program instructions that are executed; one or more execution times of the one or more computer program instructions that are executed; a state of the computer program; one or more states of one or more variables of the computer program; one or more locks or monitors held by the computer program; one or more locks or monitors acquired or released during execution of one or more computer program instructions; one or more methods executed during execution of one or more computer program instructions; one or more execution times of the one or more methods executed; one or more resources opened, accessed, or closed during execution of one or more computer program instructions; one or more classes loaded or unloaded during execution of one or more computer program instructions; an amount of memory in use by the computer program before or after a computer program instruction is executed; one or more instances of one or more objects in memory before or after a computer program instruction is executed; or an amount of information sent or received to a file or a socket during execution of one or more computer program instructions. The software application profiling environment can further store the execution history information of the one or more computer program instructions within an execution store, where an execution store is a data store that can store data, such as the execution history information of the one or more computer program instructions.

According to the illustrated embodiment, the graphical user interface of the software application profiling environment displays computer program 210. Computer program 210 includes a plurality of computer program instructions, where the plurality of computer program instructions includes computer program instruction 220.

In the illustrated embodiment, computer program instruction 220 is highlighted within the graphical user interface. The highlighting of computer program instruction 220 can represent that an execution of computer program 210 has been paused at computer program instruction 220, and that computer program instruction 220 is a current position of the execution of computer program 210.

Further, in certain embodiments, each computer program instruction of computer program 210 that is displayed within the graphical user interface, and that has been executed, such as computer program instruction 220, can be marked within the graphical user interface. The marking of the computer program instruction can include: displaying an arrow adjacent to (or within a proximity of) the computer program instruction within the graphical user interface; highlighting the computer program instruction within the graphical user interface; displaying an icon adjacent to (or within a proximity of) the computer program instruction within the graphical user interface; or displaying another type of visual indication adjacent to (or within a proximity of) the computer program instruction within the graphical user interface.

According to the embodiment, the software application profiling environment can retrieve execution history information of computer program 210 that is stored within an execution store. The software application profiling environment can further display a visualization of the stored execution history information within the graphical user interface. The visualization can either be a static visualization (where the visualization does not change in response to a user interaction with the graphical user interface) or a dynamic visualization (where the visualization does change in response to a user interaction with the graphical user interface). In the illustrated embodiment of FIG. 2, the visualization is a static visualization. However, in alternate embodiments, the visualization can be a dynamic visualization.

Further, in certain embodiments, such as the illustrated embodiment of FIG. 2, the displayed visualization can be overlaid onto computer program 210. By overlaying the displayed visualization onto computer program 210, the visualization can be displayed over, or adjacent to, the plurality of computer program instructions of computer program 210 within the graphical user interface. Thus, the graphical user interface can display a unified view of computer program 210 and the visualization, rather than two separate views, where one view includes a display of computer program 210, and the other view include a display of the visualization. In other alternate embodiments, the displayed visualization can be displayed as a button, a tooltip, or other window within the graphical user interface.

According to the illustrated embodiment, the displayed visualization of the stored execution history includes a visual execution path 230. Visual execution path 230 indicates an order of one or more computer program instructions of computer program 210 that have been executed. Thus, visual execution path 230 indicates an execution path of computer program 210, where the execution path includes the computer program instructions that have been executed. More specifically, according to the illustrated embodiment, visual execution path 230 "points to" (or otherwise references) computer program instructions 200, 201, 202, 203, 204, 205, 206, 207, 208, and 209, which are the computer program instructions of computer program 210 that have been executed. Thus, visual execution path 230 indicates that the order of the computer program instructions of computer program 210 that have been executed is: (1) computer program instruction 200; (2) computer program instruction 201; (3) computer program instruction 202; (4) computer program instruction 203; (5) computer program instruction 204; (6) computer program instruction 205; (7) computer program instruction 206; (8) computer program instruction 207; (9) computer program instruction 208; and (10) computer program instruction 209. In the illustrated embodiment, visual execution path 230 is displayed using a dotted line. However, in other alternate embodiments, visual execution path 230 can be displayed using any alternate format that indicates an execution path of the one or more computer program instructions of computer program 210, such as a solid line, an arrow, a coloring of the one or more computer program instructions of computer program 210 that have been executed, or a marking of the one or more computer program instructions of computer program 210 that have been executed.

According to the illustrated embodiment, the displayed visualization of the stored execution history further includes one or more execution duration indications, such as execution duration indication 240. An execution duration indication, such as execution duration indication 240, is a visual indication that indicates an execution duration of a computer program instruction (i.e., the duration required to execute the computer program instruction). In the illustrated embodiment, execution duration indication 240 is a displayed value, "5 MS," which indicates that the associated computer program instruction took 5 milliseconds ("ms") to execute.

The displayed visualization of the stored execution history also includes a source indication 250. Source indication 250 is an indication of a source of an execution path of computer program 210 (visually represented by visual execution path 230). In certain embodiments, the source of the execution path of computer program 210 is a computer program instruction that is part of computer program 210, where the computer program instruction is not displayed within the graphical user interface. In other embodiments, the source of the execution path of computer program 210 is a computer program instruction that is part of a source code file that is separate from the source code file that includes computer program 210.

FIG. 3 illustrates a graphical user interface of a software application profiling environment that displays a visualization of execution history information along with a plurality of computer program instructions, where the visualization includes a visual execution path between two methods of a computer program, according to an embodiment of the invention.

According to the illustrated embodiment, the graphical user interface of the software application profiling environment displays computer program 310. Computer program 310, similar to computer program 210 of FIG. 2, includes a plurality of computer program instructions. Further, the plurality of computer program instructions includes computer program instruction 320, where computer program instruction 320 is part of a first method of computer program 310. According to the embodiment, the plurality of computer program instructions further includes computer program instruction 360, where computer program instruction 360 is part of a second method of computer program 310.

In the illustrated embodiment, computer program instruction 320 is highlighted within the graphical user interface. The highlighting of computer program instruction 320 can represent that a breakpoint has been created at computer program instruction 320, and that execution of computer program 310 can pause at computer program instruction 320. In the illustrated embodiment, computer program instruction 360 is also highlighted within the graphical user interface. The highlighting of computer program instruction 360 can represent that an execution of computer program 310 has been paused at computer program instruction 360, and that computer program instruction 360 is a current position of the execution of computer program 310.

Further, in certain embodiments, each computer program instruction of computer program 310 that is displayed within the graphical user interface, and that has been executed, such as computer program instructions 320 and 360, can be marked within the graphical user interface. The marking of the computer program instruction can include: displaying an arrow adjacent to (or within a proximity of) the computer program instruction within the graphical user interface; highlighting the computer program instruction within the graphical user interface; displaying an icon adjacent to (or within a proximity of) the computer program instruction within the graphical user interface; or displaying another type of visual indication adjacent to (or within a proximity of) the computer program instruction within the graphical user interface.

According to the embodiment, the software application profiling environment can retrieve execution history information of computer program 310 that is stored within an execution store. The software application profiling environment can further display a visualization of the stored execution history information within the graphical user interface. In the illustrated embodiment of FIG. 3, the visualization is a static visualization. However, in other alternate embodiments, the visualization can be a dynamic visualization. Further, in the illustrated embodiment of FIG. 3, the displayed visualization is overlaid onto computer program 310. However, in other alternate embodiments, the displayed visualization can be displayed as a button, a tooltip, or other window within the graphical user interface.

According to the illustrated embodiment, the displayed visualization of the stored execution history includes visual execution paths 330 and 370. Visual execution path 330 indicates an order of one or more computer program instructions of computer program 310 that have been executed, where the one or more computer program instructions are within a first method. Visual execution path 370 indicates an order of one or more computer program instructions of computer program 310 that have been executed, where the one or more computer program instructions are within a second method. Thus, visual execution path 330 indicates an execution path of computer program 310 within the first method of computer program 310, and visual execution path 370 indicates an execution path of computer program 310 within the second method of computer program 310. In the illustrated embodiment, visual execution paths 330 and 370 are each displayed using a solid line. However, in other alternate embodiments, visual execution paths 330 and 370 can each be displayed using any alternate format, such as a dotted line, an arrow, a coloring of the one or more computer program instructions of computer program 310 within a first method that have been executed and the one or more computer program instructions of computer program 310 within a second method that have been executed, or a marking of the one or more computer program instructions of computer program 310 within a first method that have been executed and the one or more computer program instructions of computer program 310 within a second method that have been executed.

According to the embodiment, the displayed visualization of the stored execution history further includes destination indication 340 and source indication 350. Destination indication 340 and source indication 350 collectively indicate where the execution path of computer program 310 exits the first method of computer program 310 and enters the second method of computer program 310. More specifically, destination indication 340 indicates a destination of an execution path of computer program 310 (visually represented by visual execution path 330). Further, source indication 350 indicates a source of an execution path of computer program 310 (visually represented by visual execution path 370). In the illustrated embodiment, the first method and the second method of computer program 310 are both displayed within the graphical user interface, and are both part of a single source file. However, in alternate embodiments, one method of computer program 310 may be displayed within the graphical user interface, and another method of computer program 310 may not be displayed within the graphical user interface. In other words, in these embodiments, a source or destination of an execution path of computer program 310 can be a computer program instruction that is not displayed within the graphical user interface. Further, in other alternate embodiments, one method of computer program 310 may be part of a source code file that includes computer program 310, and another method of computer program 310 may be part of a source code file that is separate from the source code file that includes computer program 310. In other words, in these embodiments, a source or destination of an execution path of computer program 310 can be a computer program instruction that is part of a source code file that is separate from the source code file that includes computer program 310.

Figure 4:
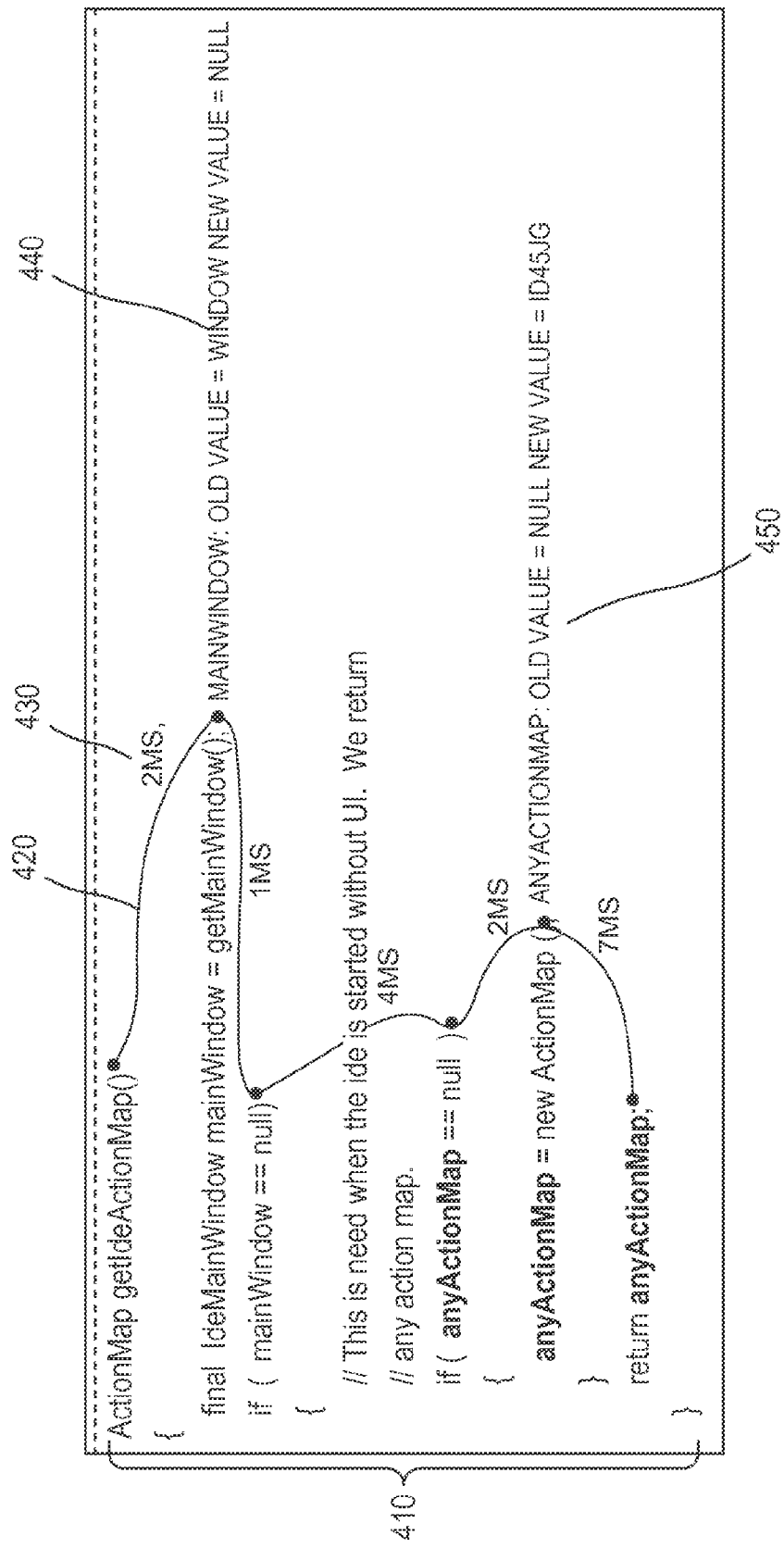
FIG. 4 illustrates a graphical user interface of a software application profiling environment that displays a visualization of execution history information along with a plurality of computer program instructions, where the visualization includes a visual execution path, and where the execution history information includes a plurality of states for a plurality of variables, according to an embodiment of the invention.

FIG. 4 illustrates a graphical user interface of a software application profiling environment that displays a visualization of execution history information along with a plurality of computer program instructions, where the visualization includes a visual execution path, and where the execution history information includes a plurality of states for a plurality of variables, according to an embodiment of the invention.

According to the illustrated embodiment, the graphical user interface of the software application profiling environment displays computer program 410. Computer program 410, similar to computer program 210 of FIG. 2 and computer program 310 of FIG. 3, includes a plurality of computer program instructions.

Further, in certain embodiments, each computer program instruction of computer program 410 that is displayed within the graphical user interface, and that has been executed, can be marked within the graphical user interface. The marking of the computer program instruction can include: displaying an arrow adjacent to (or within a proximity of) the computer program instruction within the graphical user interface; highlighting the computer program instruction within the graphical user interface; displaying an icon adjacent to (or within a proximity of) the computer program instruction within the graphical user interface; or displaying another type of visual indication adjacent to (or within a proximity of) the computer program instruction within the graphical user interface.

According to the embodiment, the software application profiling environment can retrieve execution history information of computer program 410 that is stored within an execution store. The software application profiling environment can further display a visualization of the stored execution history information within the graphical user interface. In the illustrated embodiment of FIG. 4, the visualization is a static visualization. In other alternate embodiments, the visualization can be a dynamic visualization. Further, in the illustrated embodiment of FIG. 4, the displayed visualization is overlaid onto computer program 410. However, in other alternate embodiments, the displayed visualization can be displayed as a button, a tooltip, or other window within the graphical user interface.

According to the illustrated embodiment, the displayed visualization of the stored execution history includes a visual execution path 420. Visual execution path 420 indicates an order of one or more computer program instructions of computer program 410 that have been executed. Thus, visual execution path 420 indicates an execution path of computer program 410, where the execution path includes the computer program instructions that have been executed. In the illustrated embodiment, visual execution path 420 is displayed using a solid line. However, in other alternate embodiments, visual execution path 420 can be displayed using any alternate format, such as a dotted line, an arrow, a coloring of the one or more computer program instructions of computer program 410 that have been executed, or a marking of the one or more computer program instructions of computer program 410 that have been executed.

According to the illustrated embodiment, the displayed visualization of the stored execution history further includes one or more execution duration indications, such as execution duration indication 430. As previously described, an execution duration indication, such as execution duration indication 430, is a visual indication that indicates an execution duration of a computer program instruction. In the illustrated embodiment, execution duration indication 430 is a displayed value, "2 MS," which indicates that the associated computer program instruction took 2 ms to execute.

Also according to the illustrated embodiment, the displayed visualization of the stored execution history further includes one or more variable state indications, such as variable state indications 440 and 450. A variable state indication, such as variable state indications 440 and 450, is a visual indication that indicates at least one of: a state of one or more variables before a computer program instruction is executed; or a state of the one or more variables after the computer program instruction is executed. In the illustrated embodiment, variable state indication 440 is a displayed value, "MAINWINDOW: OLD VALUE=WINDOW NEW VALUE=NULL," which indicates that a variable, mainWindow, has a state of "WINDOW" before the associated computer program instruction is executed, and that the variable has a state of "NULL" after the associated computer program instruction is executed. Further, in the illustrated embodiment, variable state indication 450 is a displayed value, "ANYACTIONMAP: OLD VALUE=NULL NEW VALUE=ID45JG," which indicates that a variable, anyActionMap, has a state of "NULL" before the associated computer program instruction is executed, and that the variable has a state of "ID45JG" after the associated computer program instruction is executed. In the illustrated embodiment, variable state indications 440 and 450 each indicate a state of a single variable both before and after an associated computer program instruction is executed. However, in alternate embodiments, a variable state indication can indicate a state of a plurality of variables both before and after the associated computer program instruction is executed. Further, in other alternate embodiments, a variable state indication can only indicate a state of a variable before an associated computer program instruction is executed or after the associated computer program instruction is executed.

An execution duration indication (such as execution duration indication 430) and a variable state indication (such as variable state indications 440 and 450) are examples of an execution history indication, where an execution history indication is a visual indication that indicates execution history information of a computer program instruction. In other alternate embodiments, other types of execution history indications can be displayed within a graphical user interface as part of the visualization of the execution history information. Such types of execution history indications can include at least one of: an execution time indication (where an execution time indication is a visual indication that indicates an execution time of a computer program instruction); a computer program state indication (where a computer program state indication is a visual indication that indicates at least one of: a state of a computer program before the computer program is executed, a state of the computer program while the computer program is executed, or a state of the computer program after the computer program is executed); a computer program instruction identity indication (where a computer program instruction identity indication is a visual indication that indicates an identity of a computer program instruction); a lock indication (where a lock indication is a visual indication that indicates a lock or a monitor acquired or released during execution of a computer program instruction); a method indication (where a method indication is a visual indication that indicates a method executed during execution of a computer program instruction); a method execution time indication (where a method execution time indication is a visual indication that indicates an execution time of a method); a resource indication (where a resource indication is a visual indication that indicates a resource opened, accessed, or closed during execution of a computer program instruction); a class indication (where a class indication is a visual indication that indicates a class loaded or unloaded during execution of a computer program instruction); a memory indication (where a memory indication is a visual indication that indicates at least one of: an amount of memory in use by the computer program before a computer program instruction is executed, or an amount of memory in use by the computer program after a computer program is executed); an object indication (where an object indication is a visual indication that indicates at least one of: an instance of an object in memory before a computer program instruction is executed, or an instance of an object in memory after a computer program instruction is executed); or a file information indication (where a file information indication is a visual indication that indicates an amount of information sent or received to a file or a socket during execution of a computer program instruction).

Figure 5:
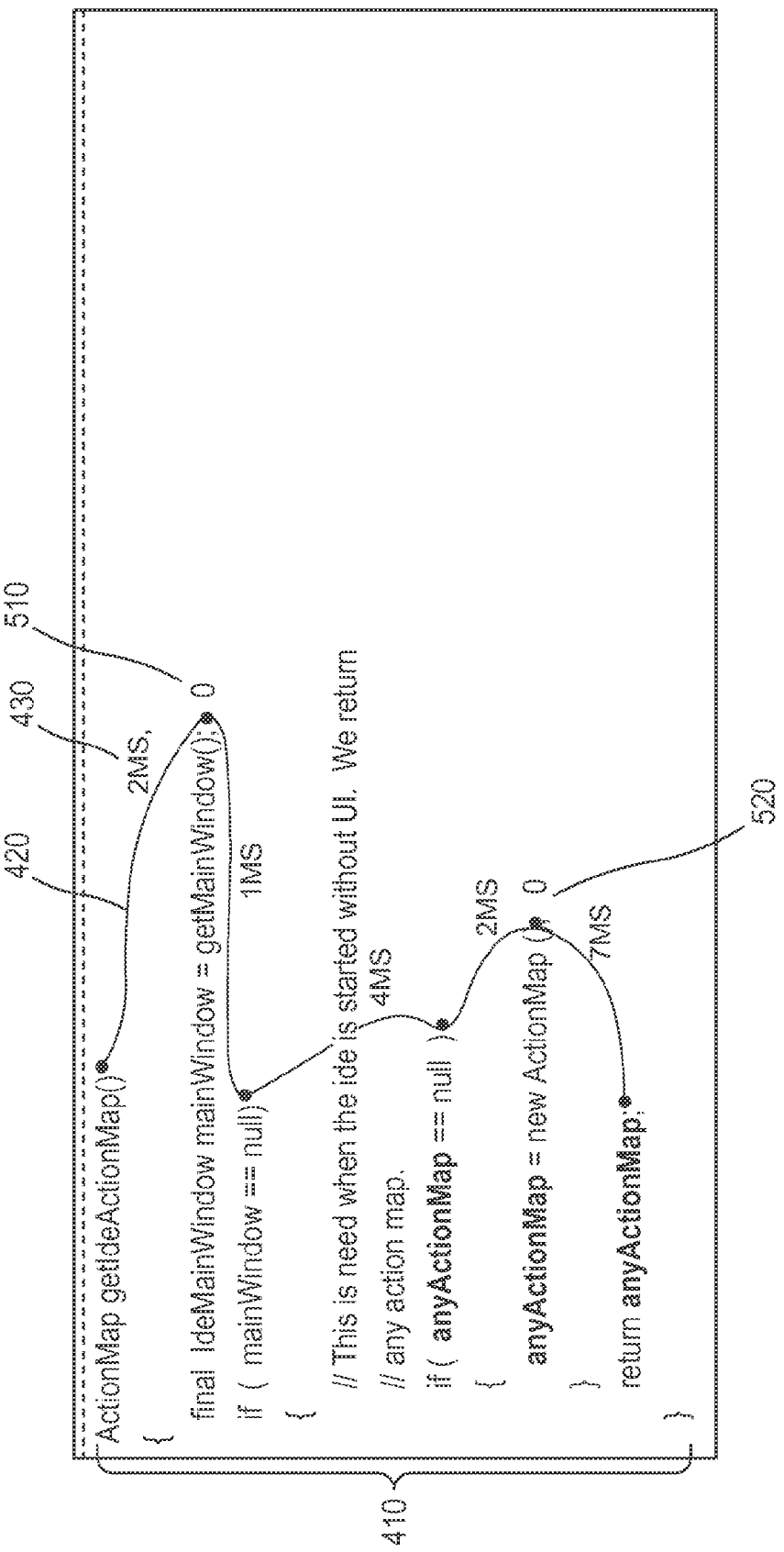
FIG. 5 illustrates a graphical user interface of a software application profiling environment that displays a visualization of execution history information along with a plurality of computer program instructions, where the visualization indicates additional execution history information that can be displayed upon a user interaction, according to an embodiment of the invention.

FIG. 5 illustrates a graphical user interface of a software application profiling environment that displays a visualization of execution history information along with a plurality of computer program instructions, where the visualization indicates additional execution history information that can be displayed upon a user interaction, according to an embodiment of the invention. Components of the graphical user interface illustrated in FIG. 5 that are identical to components of the graphical user interface illustrated in FIG. 4 (i.e., computer program 410, visual execution path 420, and execution duration indication 430) have been previously described in conjunction with FIG. 4, and are not described again.

As previously described, a visualization of execution history information can either be a static visualization or a dynamic visualization. In the illustrated embodiment of FIG. 5, the visualization is a dynamic visualization. Thus, the visualization indicates additional execution history information that can be displayed upon a user interaction with the graphical user interface. More specifically, the visualization includes additional execution history information indications 510 and 520. An additional execution history information indication, such as additional execution history information indications 510 and 520, is an icon that is displayed within the graphical user interface, where the icon indicates that additional execution history information can be displayed upon an interaction with the graphical user interface. An example of an interaction with the graphical user interface can include placing a cursor displayed within the graphical user interface over the additional execution history information indication (such as additional execution history information indications 510 and 520), or over any region of the graphical user interface. Another example of an interaction with the graphical user interface can include "clicking" on the additional execution history information indication (such as additional execution history information indications 510 and 520), or on any region of the graphical user interface, using a cursor control, such as a computer mouse. In the illustrated embodiment, additional execution history information indications 510 and 520 are circle icons. However, this is an example embodiment, and, in other alternate embodiments, an additional execution history information indication can be any icon.

Figure 6:
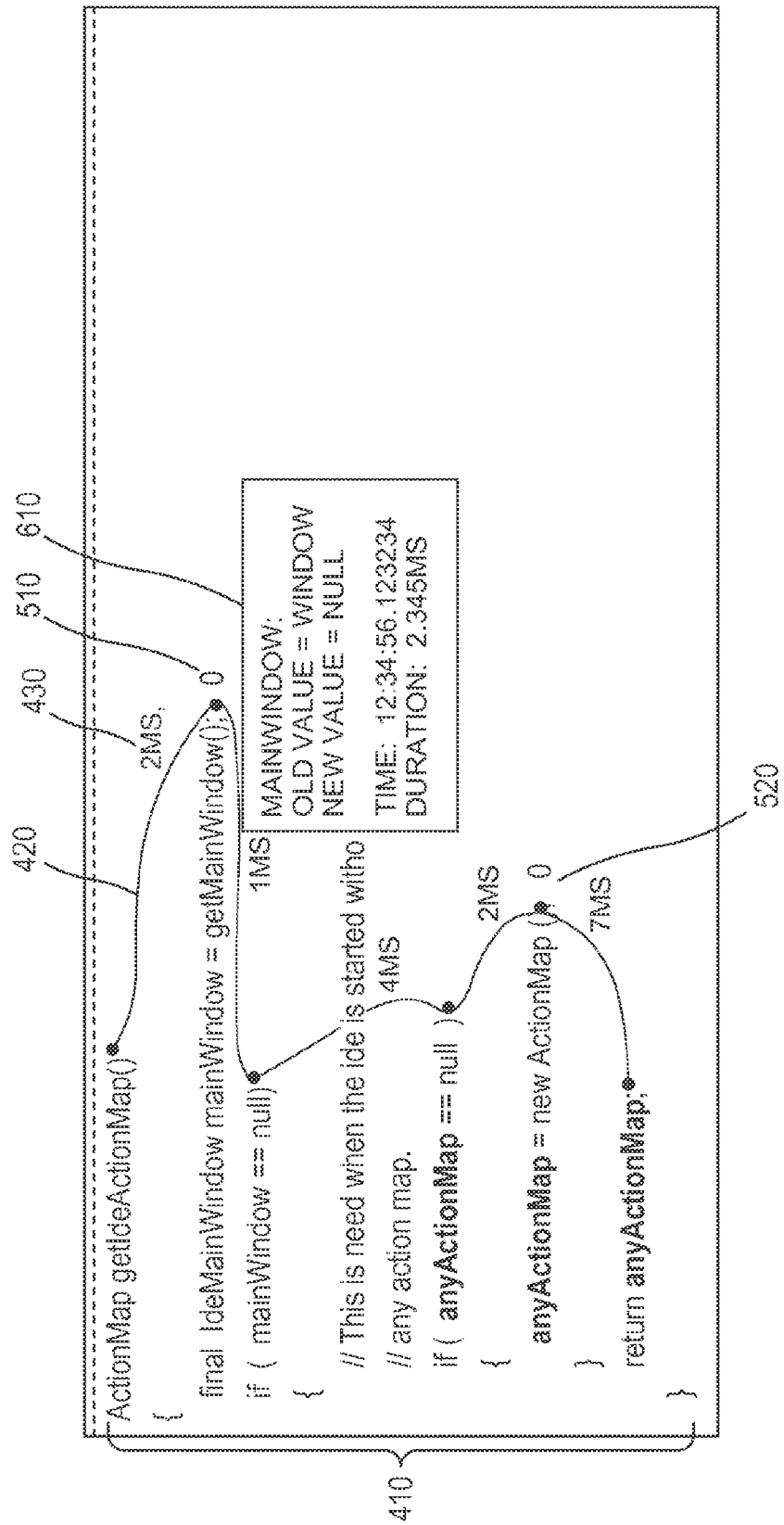
FIG. 6 illustrates a graphical user interface of a software application profiling environment that displays a visualization of execution history information along with a plurality of computer program instructions, where the visualization includes additional execution history information that is displayed in response to a user interaction, according to an embodiment of the invention.

FIG. 6 illustrates a graphical user interface of a software application profiling environment that displays a visualization of execution history information along with a plurality of computer program instructions, where the visualization includes additional execution history information that is displayed in response to a user interaction, according to an embodiment of the invention. Components of the graphical user interface illustrated in FIG. 6 that are identical to components of the graphical user interface illustrated in FIG. 4 (i.e., computer program 410, visual execution path 420, and execution duration indication 430) have been previously described in conjunction with FIG. 4, and are not described again. Further, components of the graphical user interface illustrated in FIG. 6 that are identical to components of the graphical user interface illustrated in FIG. 5 (i.e., additional execution history information indications 510 and 520) have been previously described in conjunction with FIG. 5, and are not described again.

As previously described, a visualization of execution history information can either be a static visualization or a dynamic visualization. In the illustrated embodiment of FIG. 6, the visualization is a dynamic visualization. Thus, the visualization indicates additional execution history information that can be displayed upon a user interaction with the graphical user interface. More specifically, the visualization includes additional information window 610. Additional information window 610 is a window that displays additional information about an execution history of computer program 410 in response to a user interaction with the graphical user interface (such as the user interactions previously described in conjunction with FIG. 5). This additional execution history information can be in addition to execution history information (such as visual execution path 420 and execution duration indication 430) that is also displayed within the graphical user interface as part of the displayed visualization. Further, in an alternate embodiment, additional information window 610 can be a window that the user can interact with dynamically. For example, additional information window 610 can be an inspector window which allows the user to "drill down" into the additional execution history information displayed within the additional information window 610.

Similar to the execution history information that can be displayed within the graphical user interface as part of the displayed visualization, the additional execution history information can include at least one of: one or more identities of one or more computer program instructions that are executed; an order of the one or more computer program instructions that are executed; one or more execution durations of the one or more computer program instructions that are executed; one or more execution times of the one or more computer program instructions that are executed; a state of the computer program; one or more states of one or more variables of the computer program; one or more locks or monitors held by the computer program; one or more locks or monitors acquired or released during execution of one or more computer program instructions; one or more methods executed during execution of one or more computer program instructions; one or more execution times of the one or more methods executed; one or more resources opened, accessed, or closed during execution of one or more computer program instructions; one or more classes loaded or unloaded during execution of one or more computer program instructions; an amount of memory in use by the computer program before or after a computer program instruction is executed; one or more instances of one or more objects in memory before or after a computer program instruction is executed; or an amount of information sent or received to a file or a socket during execution of one or more computer program instructions.

In the illustrated embodiment, additional information window 610 displays the following additional execution history information: a state of a variable, mainWindow, before an associated computer program instruction is executed and a state of the variable after the associated computer program instruction is executed (represented by the value, "MAINWINDOW: OLD VALUE=WINDOW NEW VALUE=NULL"); an execution time of the associated computer program instruction that is executed (represented by the value, "TIME: 12:34:56.123234"), and an execution duration of the associated computer program instruction that is executed (represented by the value, "DURATION: 2.345 MS"). However, this is only an example embodiment, and in other alternate embodiments, additional information window 610 can display any additional execution history information.

Figure 7:
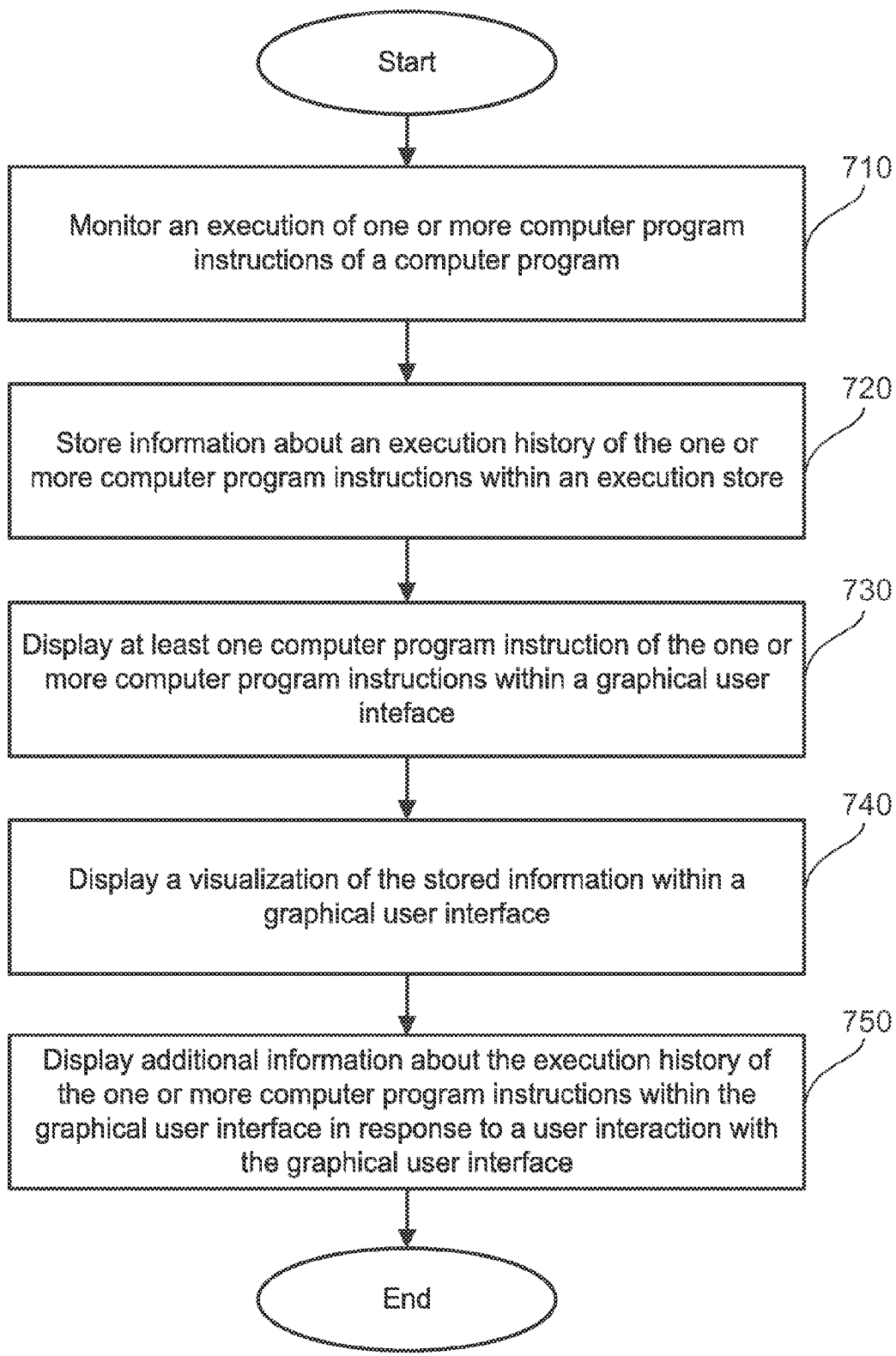
FIG. 7 illustrates a flow diagram of the functionality of an execution visualization module, according to an embodiment of the invention.

FIG. 7 illustrates a flow diagram of the functionality of an execution visualization module (such as execution visualization module 16 of FIG. 1), according to an embodiment of the invention. In one embodiment, the functionality of the flow diagram of FIG. 7 is implemented by software stored in a memory or some other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The flow begins and proceeds to 710. At 710, an execution of one or more computer program instructions of a computer program is monitored. In certain embodiments, the execution of the one or more computer program instructions of the computer program is monitored by a software application profiling environment. In some of these embodiments, the software application profiling environment is a software application. Further, in some of those embodiments, the software application profiling environment is a debugger. Additionally, in certain embodiments, the computer program is part of a software application. In some embodiments, the monitoring of the execution of the one or more computer program instructions of the computer program is an automated process (such as a profiler). In alternate embodiments the monitoring of the execution of the one or more computer program instructions of the computer program is a manual process (such as a user stepping through one computer program instruction after another, and stopping at a debugger breakpoint associated with a computer program instruction). The flow proceeds to 720.

At 720, information about an execution history of the one or more computer program instructions that are executed is stored. Thus, for each computer program instruction that is executed, information about the execution history of the computer program instruction is stored. In certain embodiments, the stored information includes at least one of: one or more identities of one or more computer program instructions that are executed; an order of the one or more computer program instructions that are executed; one or more execution durations of the one or more computer program instructions that are executed; one or more execution times of the one or more computer program instructions that are executed; a state of the computer program; one or more states of one or more variables of the computer program; one or more locks or monitors held by the computer program; one or more locks or monitors acquired or released during execution of one or more computer program instructions; one or more methods executed during execution of one or more computer program instructions; one or more execution times of the one or more methods executed; one or more resources opened, accessed, or closed during execution of one or more computer program instructions; one or more classes loaded or unloaded during execution of one or more computer program instructions; an amount of memory in use by the computer program before or after a computer program instruction is executed; one or more instances of one or more objects in memory before or after a computer program instruction is executed; or an amount of information sent or received to a file or a socket during execution of one or more computer program instructions. In certain embodiments, the execution history of the one or more computer program instructions that are executed is stored within an execution store. The flow proceeds to 730.

At 730, at least one computer program instruction of the one or more computer program instructions is displayed within a graphical user interface. In certain embodiments, the one or more computer program instructions are part of a single source code file. However, in alternate embodiments, the at least one displayed computer program instruction is part of a first source code file, and at least one computer program instruction of the one or more computer program instructions is part of a second source code file.

Further, in certain embodiments, each computer program instruction that is displayed within the graphical user interface, and that has been executed, is marked within the graphical user interface. The marking of the computer program instruction can include: displaying an arrow adjacent to (or within a proximity of) the computer program instruction within the graphical user interface; highlighting the computer program instruction within the graphical user interface; displaying an icon adjacent to (or within a proximity of) the computer program instruction within the graphical user interface; or displaying another type of visual indication adjacent to (or within a proximity of) the computer program instruction within the graphical user interface. The flow proceeds to 740.

At 740, a visualization of the stored information is displayed within the graphical user interface. In certain embodiments, the displaying the visualization of the stored information further includes overlaying the displayed visualization of the stored information onto the at least one displayed computer program instruction. In alternate embodiments, the displaying the visualization of the stored information further includes at least one of: displaying the visualization of the stored information as a button within the graphical user interface; displaying the visualization of the stored information as a tooltip within the graphical user interface; or displaying the visualization of the stored information as a window within the graphical user interface. In certain embodiments, the visualization of the stored information is displayed while the computer program is being executed. In other alternate embodiments, the visualization of the stored information is displayed after the computer program is executed.

In certain embodiments, the visualization of the stored information is a static visualization. In some of these embodiments, the static visualization includes a visual execution path that indicates an order of the one or more computer program instructions that are executed. Further, in some of these embodiments, the visual execution path is displayed using a dotted line. However, in other alternate embodiments, the visual execution path is displayed using at least one of: a solid line; an arrow; a coloring of the one or more computer program instructions that have been executed; or a marking of the one or more computer program instructions that have been executed.

Further, in some embodiments, the static visualization includes at least one of: a source indication that indicates a source of the visual execution path; or a destination indication that indicates a destination of the visual execution path. In embodiments where the source of the visual execution path is a computer program instruction that is part of a separate source code file, the source indication further indicates the separate source code file. In embodiments where the destination of the visual execution path is a computer program instruction that is part of a separate source file, the destination indication further indicates the separate source code file.

Further, in some embodiments, the static visualization includes one or more execution history indications, where an execution history indication is a visual indication that indicates information about an execution history of a computer program instruction. In certain embodiments, the one or more execution history indications include an execution duration indication. An execution duration indication is a visual indication that indicates an execution duration of a computer program instruction. Further in some embodiments, the one or more execution history indications include an execution time indication. An execution time indication is a visual indication that indicates an execution time of a computer program instruction. Also, in some embodiments, the one or more execution history indications include a variable state indication. A variable state indication is a visual indication that indicates at least one of: a state of one or more variables before a computer program instruction is executed; or a state of the one or more variables after the computer program instruction is executed. Further, in some embodiments, the one or more execution history indications include a computer program state indication. A computer program state indication is a visual indication that indicates at least one of: a state of a computer program before the computer program is executed; a state of the computer program while the computer program is executed; or a state of the computer program after the computer program is executed. Further in some embodiments, the one or more execution history indications include a computer program instruction identity indication. A computer program instruction identity indication is a visual indication that indicates an identity of a computer program instruction. Further, in other embodiments, the one or more execution history indications include at least one of: a lock indication; a method indication; a method execution time indication; a resource indication; a class indication; a memory indication; an object indication; or a file information indication.

In alternate embodiments, the visualization of the stored information is a dynamic visualization. In these embodiments, the dynamic visualization includes one or more additional information indications, where an additional information indication displays additional information about the execution history of the one or more computer program instructions in response to a user interaction with the graphical user interface. In certain embodiments, the user interaction with the graphic user interface includes placing a cursor displayed within the graphical user interface over a region of the graphical user interface. In some of these embodiments, the region of the graphical user interface is the additional information indication. In other alternate embodiments, the user interaction with the graphical user interface includes clicking on the region of the graphical user interface using a cursor control. In some of these embodiments, the region of the graphical user interface is the additional information indication. The flow proceeds to 750.

At 750, additional information about the execution history of the one or more computer program instructions is displayed within the graphical user interface in response to a user interaction with the graphical user interface. In some of these embodiments, the additional information is displayed within a window that is also displayed within the graphical user interface. Further, in some of these embodiments, the additional information includes at least one of: one or more identities of one or more computer program instructions that are executed; an order of the one or more computer program instructions that are executed; one or more execution durations of the one or more computer program instructions that are executed; one or more execution times of the one or more computer program instructions that are executed; a state of the computer program; one or more states of one or more variables of the computer program; one or more locks or monitors held by the computer program; one or more locks or monitors acquired or released during execution of one or more computer program instructions; one or more methods executed during execution of one or more computer program instructions; one or more execution times of the one or more methods executed; one or more resources opened, accessed, or closed during execution of one or more computer program instructions; one or more classes loaded or unloaded during execution of one or more computer program instructions; an amount of memory in use by the computer program before or after a computer program instruction is executed; one or more instances of one or more objects in memory before or after a computer program instruction is executed; or an amount of information sent or received to a file or a socket during execution of one or more computer program instructions. In certain embodiments, 750 is omitted. The flow then ends.

Thus, according to an embodiment, a software application profiling environment can be provided that displays a visualization of execution history information of a computer program, where the execution history information is visually overlaid onto the one or more computer program instructions of the computer program. The execution history information can include a visual execution path that indicates an order of the one or more computer program instructions that are executed. Thus, a user can see (with no extra input) exactly how execution of a computer program proceed to a current computer program instruction (i.e., which computer program instructions were executed, and which computer program instructions were not executed). Further, the execution history information can include one or more execution history indications. Thus, the user can see execution history statistics along the visual execution path. Further, in certain embodiments where a user can navigate both backwards and forwards through an execution path, the user can navigate back to a previous computer program instruction on the visual execution path, and resume execution from that computer program instruction. Further, the execution history indications can display execution history statistics both before and after an associated computer program instruction is executed. Thus, the user can visualize an entire execution history of the computer program.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A computer-implemented method for displaying a visualization of an execution history of a computer program, the computer-implemented method comprising:
    monitoring an execution of one or more computer program instructions of a computer program;
    storing information about an execution history of the one or more computer program instructions within an execution store;
    displaying at least one computer program instruction of the one or more computer program instructions within a graphical user interface; and
    displaying a visualization of the stored information within a graphical user interface;
    wherein the stored information further comprises an order of the one or more computer program instructions that are executed;
    wherein the displaying the visualization of the stored information further comprises displaying a visual execution path that indicates the order of the one or more computer program instructions that are executed;
    wherein the at least one displayed computer program instruction is part of a first source code file;
    wherein at least one computer program instruction of the one or more computer program instructions is part of a second source code file; and
    wherein the visual execution path comprises a source indication that indicates that the first source file is a source of the visual execution path, and a destination indication that indicates that the second source code file is a destination of the visual execution path.

2. The computer-implemented method of claim 1, wherein the displaying the visualization of the stored information further comprises overlaying the displayed visualization of the stored information onto the at least one displayed computer program instruction.

3. The computer-implemented method of claim 1, wherein the stored information further comprises at least one of:
    one or more identities of the one or more computer program instructions that are executed;
    one or more execution durations of the one or more computer program instructions that are executed;
    one or more execution times of the one or more computer program instructions that are executed;
    a state of the computer program;
    one or more states of one or more variables of the computer program;
    one or more locks or monitors held by the computer program;
    one or more locks or monitors acquired or released during execution of the one or more computer program instructions;
    one or more methods executed during execution of the one or more computer program instructions;
    one or more execution times of the one or more methods executed;
    one or more resources opened, accessed, or closed during execution of the one or more computer program instructions;
    one or more classes loaded or unloaded during execution of the one or more computer program instructions;
    an amount of memory in use by the computer program before or after a computer program instruction is executed;
    one or more instances of one or more objects in memory before or after a computer program instruction is executed; or
    an amount of information sent or received to a file or a socket during execution of the one or more computer program instructions.

4. The computer-implemented method of claim 1, wherein the visualization of the stored information comprises a static visualization.

5. The computer-implemented method of claim 1, wherein the visualization of the stored information comprises a dynamic visualization.

6. A non-transitory computer-readable medium having instructions stored thereon that, when executed by a processor, cause the processor to display a visualization of an execution history of a computer program, the displaying the visualization of the execution history of the computer program comprising:

monitoring an execution of one or more computer program instructions of a computer program;

storing information about an execution history of the one or more computer program instructions;

displaying at least one computer program instruction of the one or more computer program instructions within a graphical user interface; and displaying a visualization of the stored information within a graphical user interface;

wherein the stored information further comprises an order of the one or more computer program instructions that are executed;

wherein the displaying the visualization of the stored information further comprises displaying a visual execution path that indicates the order of the one or more computer program instructions that are executed;

wherein the at least one displayed computer program instruction is part of a first source code file;

wherein at least one computer program instruction of the one or more computer program instructions is part of a second source code file; and wherein the visual execution path comprises a source indication that indicates that the first source file is a source of the visual execution path, and a destination indication that indicates that the second source code file is a destination of the visual execution path.

7. The non-transitory computer-readable medium of claim 1, wherein the displaying the visualization of the stored information further comprises overlaying the displayed visualization of the stored information onto the at least one displayed computer program instruction.

8. The non-transitory computer-readable medium of claim 1, wherein the stored information further comprises at least one of:

one or more identities of the one or more computer program instructions that are executed;

one or more execution durations of the one or more computer program instructions that are executed;

one or more execution times of the one or more computer program instructions that are executed;

a state of the computer program;

one or more states of one or more variables of the computer program; one or more locks or monitors held by the computer program;

one or more locks or monitors acquired or released during execution of the one or more computer program instructions;

one or more methods executed during execution of the one or more computer program instructions;

one or more execution times of the one or more methods executed;

one or more resources opened, accessed, or closed during execution of the one or more computer program instructions;

one or more classes loaded or unloaded during execution of the one or more computer program instructions;

an amount of memory in use by the computer program before or after a computer program instruction is executed;

one or more instances of one or more objects in memory before or after a computer program instruction is executed; or an amount of information sent or received to a file or a socket during execution of the one or more computer program instructions.

9. The non-transitory computer-readable medium of claim 1, wherein the visualization of the stored information comprises a static visualization.

10. The non-transitory computer-readable medium of claim 9, wherein the static visualization comprises the visual execution path that indicates the order of the one or more computer program instructions that are executed.

11. The non-transitory computer-readable medium of claim 1, wherein the visualization of the stored information comprises a dynamic visualization.

12. The non-transitory computer-readable medium of claim 11, wherein the dynamic visualization comprises an additional information indication that displays additional information about the execution history of the one or more computer program instructions in response to a user interaction with the graphical user interface.

13. The non-transitory computer-readable medium of claim 12, the displaying the visualization of the execution history of the computer program further comprising displaying additional information about the execution history of the one or more computer program instructions within the graphical user interface in response to a user interaction with the graphical user interface.

14. The non-transitory computer-readable medium of claim 13, wherein the user interaction comprises placing a cursor displayed within the graphical user interface over a region of the graphical user interface.

15. The non-transitory computer-readable medium of claim 1, wherein the information about the execution history of the one or more computer program instructions is stored within an execution store.

16. A system for displaying a visualization of an execution history of a computer program, comprising:

a processor;

an execution monitoring module configured to monitor an execution of one or more computer program instructions of a computer program;

an execution storage module configured to store information about an execution history of the one or more computer program instructions within an execution store;

a computer program instruction display module configured to display at least one computer program instruction of the one or more computer program instructions within a graphical user interface; and a visualization display module configured to display a visualization of the stored information within a graphical user interface;

wherein the stored information further comprises an order of the one or more computer program instructions that are executed;

wherein the visualization display module is further configured to display a visual execution path that indicates the order of the one or more computer program instructions that are executed;

wherein the at least one displayed computer program instruction is part of a first source code file;

wherein at least one computer program instruction of the one or more computer program instructions is part of a second source code file; and wherein the visual execution path comprises a source indication that indicates that the first source file is a source of the visual execution path, and a destination indication that indicates that the second source code file is a destination of the visual execution path.

17. The system of claim 16, wherein the visualization display module is further configured to overlay the displayed visualization of the stored information onto the at least one displayed computer program instruction.

18. The system of claim 16, wherein the stored information further comprises at least one of:
- one or more identities of the one or more computer program instructions that are executed;
- one or more execution durations of the one or more computer program instructions that are executed;
- one or more execution times of the one or more computer program instructions that are executed;
- a state of the computer program;
- one or more states of one or more variables of the computer program;
- one or more locks or monitors held by the computer program;
- one or more locks or monitors acquired or released during execution of the one or more computer program instructions;
- one or more methods executed during execution of the one or more computer program instructions;
- one or more execution times of the one or more methods executed;
- one or more resources opened, accessed, or closed during execution of the one or more computer program instructions;
- one or more classes loaded or unloaded during execution of the one or more computer program instructions;
- an amount of memory in use by the computer program before or after a computer program instruction is executed;
- one or more instances of one or more objects in memory before or after a computer program instruction is executed; or
- an amount of information sent or received to a file or a socket during the execution of one or more computer program instructions.

19. The system of claim 16, wherein the visualization of the stored information comprises a static visualization.

20. The system of claim 16, wherein the visualization of the stored information comprises a dynamic visualization.

* * * * *

UNITED STATES PATENT AND TRADEMARK OFFICE
CERTIFICATE OF CORRECTION

PATENT NO. : 9,129,063 B2  
APPLICATION NO. : 13/893429  
DATED : September 8, 2015  
INVENTOR(S) : Cochrane et al.

Page 1 of 1

It is certified that error appears in the above-identified patent and that said Letters Patent is hereby corrected as shown below:

In the claims

Column 17, line 35-36, claim 7, delete "claim 1," and insert -- claim 6, --, therefor.

Column 17, line 40-41, claim 8, delete "claim 1," and insert -- claim 6, --, therefor.

Column 18, lines 7-8, claim 9, delete "claim 1," and insert -- claim 6, --, therefor.

Column 18, line 15, claim 11, delete "claim 1," and insert -- claim 6, --, therefor.

Column 18, line 35, claim 15, delete "claim 1," and insert -- claim 6, --, therefor.

Signed and Sealed this  
Seventh Day of June, 2016

Michelle K. Lee  
*Director of the United States Patent and Trademark Office*